United States Patent Office 2,755,464
Patented July 17, 1956

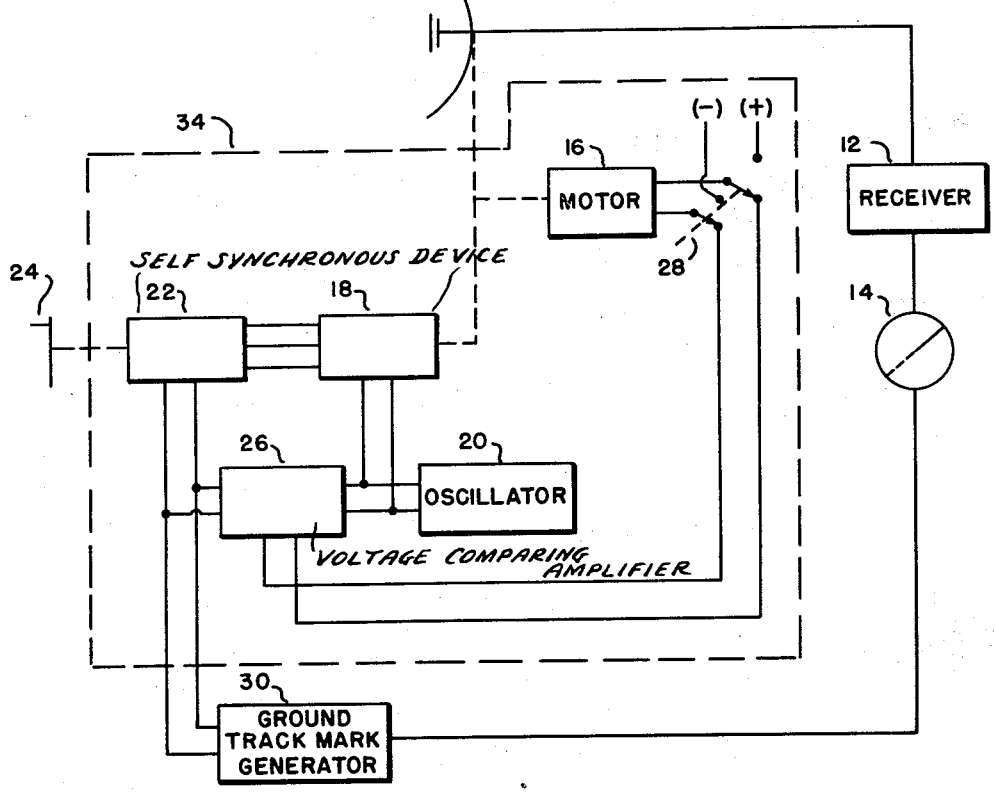
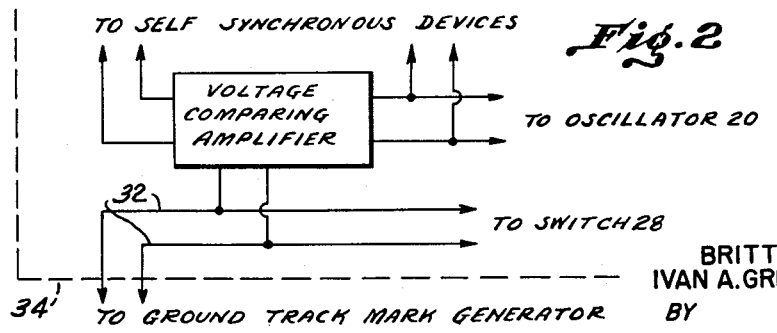

2,755,464

GROUND TRACK INDICATOR

Britton Chance, Cambridge, and Ivan A. Greenwood, Jr., Boston, Mass., assignors, by mesne assignments, to the United States of America as represented by the Secretary of War Application January 29, 1946, Serial No. 644,166

5 Claims. (Cl. 343—16)

This invention relates to an airborne radar or radio object locating system and more particularly to apparatus in conjunction with the radar system for presenting on the indicator thereof data concerning the ground track of the aircraft. The ground track of the aircraft is its path relative to the ground and is therefore an orthogonal projection on the ground of the aircraft's actual forward line of travel. Due to external forces such as wind, the ground track will in general be different from the apparent direction of travel as indicated by the aircraft's compass.

As disclosed in the copending application of Rubby Sherr, entitled Method for Determining Drift Angle, Serial No. 624,907, filed October 26, 1945, now abandoned, the ground track of an aircraft may be determined by employing in the aircraft a radar or radio object locating system. In such a system echo pulses received at the aircraft from ground targets are inherently amplitude modulated due to the Doppler effect and the frequency of the amplitude modulation is a minimum when the center line of the antenna of the radar system is coincident with the ground track of the aircraft. The amplitude modulation of the returned echoes may be observed on the usual cathode ray tube indicator.

It is an object of the present invention therefore to provide electromechanical apparatus for pressing a continuous indication on a cathode ray tube indicator of the ground track of an aircraft.

It is a further object of the present invention to provide apparatus which may be easily added to existing apparatus to provide the desired indication.

Other objects of the present invention will become apparent from the following detailed description which is to be read in connection with the accompanying drawings, Figure 1 of which illustrates in schematic block diagram form the preferred embodiment of the present invention. Figure 2 thereof shows a modified portion of the form of Figure 1 illustrating an alternative form of the invention.

In Figure 1 of the accompanying drawing an antenna 10 of a radar system, portions of which are not shown, is connected to a receiver 12 the output of which is connected to a cathode ray tube indicator 14, both of which also form a part of the radar system. The radar system employed is preferably of the type disclosed in the cited copending application of Rubby Sherr and as such is capable of providing an indication by virtue of the Doppler effect of the relative motion of the radar system and energy reflecting objects. The indicator 14 is preferably stabilized relative to a fixed direction such as true or magnetic north by means of a compass or gyro. The antenna 10 is mechanically connected to a motor 16, preferably of the direct current type, and to the rotor of a self-synchronous device 18. The rotor winding of the device 18 is energized by an oscillator 20. The stator windings of the device 18 are connected to the stator windings of a second self-synchronous device 22. The rotor of the device 22 is mechanically connected to a suitable handwheel 24. The rotor winding of the device 22 is electrically connected to voltage comprising amplifier 26 which is also connected to the oscillator 20. The amplifier 26 may be any device well known in the art capable of comparing the voltage derived from the device 22 with the reference voltage from the oscillator 20 to provide a D.-C. output voltage which is indicative in polarity and magnitude of the error in angular position existing between the antenna 10 and the handwheel 24. Such a device will normally include a phase detector and suitable D.-C. amplifiers or relays. The D.-C. output from the amplifier 26 is connected to two terminals of a double-pole double-throw switch 28. The common terminals of the switch 28 are connected to the motor 16. The remaining two terminals of the switch 28 are connected to a suitable source of potential indicated by + and − signs.

A ground track mark generator 30 is connected to the indicator 14 and to the rotor winding of the device 22. An alternative input to the ground track mark generator 30 is shown in Figure 2 of the drawing wherein the input to the ground track generator 30 is from the voltage comparing amplifier by means of the leads 32 rather than from the self synchronous device 22.

The portion of the apparatus in the drawing enclosed by the dashed block 34 and which includes the motor 16, self-synchronous devices 18 and 22, amplifier 26 and oscillator 20 constitutes what is known in the art as a servo system. The term, "servo system," refers to a mechanism, whereby one shaft, in this case the rotor winding of the self-synchronous device 22 causes another shaft, in this case the rotor winding of the self-synchronous device 18, to follow it in angular motion and it amplifies the torque and power between the two. The basic operation of such a servo system is well known in the art and its operation therefore will not be described in detail. To place the apparatus illustrated by the accompanying drawing in operation, the switch 28 is first placed in the position as shown connecting the output of the servo amplifier 26 to the motor 16. Rotation of the handwheel 24 will cause an error in the relative angular displacements of the antenna 10 and the handwheel 24 as measured from predetermined reference points with a resulting error in the displacements of the respective rotors of the devices 18 and 22. This error in displacement will result in a voltage output from the rotor winding of the device 22. This error voltage is applied to the amplifier 26 wherein it is compared with reference signals from the oscillator 20 to provide a D.-C. output voltage which is applied through the switch 28 to the motor 16. The polarity of the D.-C. output voltage is such that the motor 16 rotates the antenna 10 and the rotor of the device 18 in such a direction that the error in relative angular displacement between the antenna 10 and handwheel 24 is reduced to zero. The handwheel 24 is adjusted until the frequency of modulation of returned signals, as observed on the indicator 14, reaches a minimum value. The antenna 10 is then pointing in the direction of the ground track of the aircraft and the position of the handwheel 24 is indicative of the angle between the aircraft direction as indicated by its compass and the ground track of the aircraft and may be calibrated to read this difference if desired. The switch 28 is now placed in the opposite position such that the motor 16 is connected to the constant D.-C. source. This will result in the antenna 10 rotating continuously and in a presentation on the indicator 14 of the Plan Position Indication or PPI type in which all the targets within the range of the radar system are portrayed in polar coordinate form. The handwheel 24 is not moved from the position previously set.

There will be an error voltage from the rotor winding of the device 22 which varies in amplitude as the antenna 10 rotates through a complete cycle. This error voltage is applied to the ground track mark generator 30 which generates a suitable voltage which causes illumination of one or more sweep traces on the indicator 14. The ground track mark generator 30 may be of the type disclosed and claimed in the copending application of Amasa S. Bishop entitled Electrical Circuit, Serial No. 598,157, filed June 7, 1945, now Patent No. 2,547,363, issued April 3, 1951, or in the application of France B. Berger and Frederick F. Slack entitled Electrical Apparatus, Serial No. 611,658, filed August 20, 1945, now Patent No. 2,572,975, issued October 30, 1951. The circuits disclosed in the cited copending applications require that the input thereto be a modulated sinusoidal voltage and the input thereto must therefore be derived from the device 22. The ground track mark generator 30 generates a voltage at the instant when the output from the device 22 passes through zero. It will be obvious that this condition corresponds to the conditions present when the initial adjustment of the handwheel 24 was made and therefore that the indication properly represents the ground track of the aircraft. Other circuits for generating the desired voltage for application to the indicator 14 may require a D.-C. voltage with changes in polarity at the proper time, and for this reason the alternate connection to the amplifier 26 indicated by the lines 32 is shown.

While there has been described what is at present considered the preferred embodiments of the present invention, it will be obvious to those skilled in the art that various changes and modifications may be made therein without departing from the scope of the invention. For example, one obvious modification would be the substitution of other data transmitting devices such as potentiometers instead of the self-synchronous devices herein described.

What is claimed is:

1. In a radio object locating system including a directive antenna, driving means coupled thereto for rotating said antenna, a power supply for operating said driving means, and a signal indicator coupled to said antenna, the apparatus for producing an indication of a predetermined instantaneous position of said antenna as it rotates comprising an adjustable angular position control means, an electromechanical device coupled between said control means and said antenna for generating a differential voltage indicative of the relative angular displacement of said antenna and said control means, switching means in one position coupling the output of said electromechanical device to said driving means for causing said antenna to take a predetermined position in accordance with the position of said control means, said switching means in another position coupling said power supply to said driving means for rotating said antenna, and means coupled between said electromechanical device and said indicator for generating in response to said differential voltage a signal indicative of the instants that the antenna is in said predetermined position and for applying said signal to said indicator for obtaining an indication of said predetermined position as said antenna rotates.

2. In a radio object locating system in an airplane including a directive receiving antenna, driving means coupled thereto for rotating said antenna, a power supply for energizing said driving means, and a signal indicator coupled to said antenna, the apparatus for producing a continuous indication of the actual course of the aircraft with respect to ground as the antenna rotates comprising an adjustable rotary position control means for said antenna, an electromechanical device coupled between said control means and said antenna for generating a differential voltage indicative of the relative angular displacement of said antenna and said control means, a voltage-transforming device coupled to said electromechanical device for generating in response to said differential voltage a direct voltage representative in magnitude and polarity of the relative angular displacement of said antenna and said control means, switching means in one position coupling the output of said voltage transforming device to said driving means for causing said antenna to take a predetermined angular position in accordance with the position of said control means, said predetermined position being along the actual course of said airplane, said switching means in another position connecting said power supply to said driving means for continuously rotating said antenna, and means responsive to said differential voltage for generating a signal indicative of the instants that the antenna is directed along said actual course and for applying said signal to said indicator for obtaining a continuous indication of said actual course as said antenna rotates.

3. Apparatus according to claim 2 in which said last-mentioned generating means is coupled between said voltage transforming device and said indicator for generating said signal in response to said direct voltage.

4. Apparatus according to claim 2 in which said last-mentioned generating means is coupled between said electromechanical device and said indicator for generating said signal directly in response to said differential voltage.

5. In a radio object locating system in an airplane including a directive antenna, driving means mechanically connected to said antenna for rotating the same, a power supply for continuously operating said driving means, and a signal indicator coupled to said antenna, the apparatus for producing a continuous indication of the actual course of the aircraft with respect to ground as the antenna rotates comprising first self-synchronous means including a stator and a rotor mechanically connected to said antenna, an adjustable angular position control means, second self-synchronous means including a stator and a rotor mechanically connected to said control means, signal generating means electrically connected to the rotor of said first self-synchronous means, means electrically interconnecting the stators of both said self-synchronous means, voltage comparing means connected to the rotors of both said self-synchronous means for producing a differential voltage indicative in magnitude and polarity of the relative displacement of said antenna and said control means, switching means in one position connecting the output of said voltage comparing means to said driving means for causing said antenna to take a predetermined position in accordance with the position of said control means and in another position connecting said power supply to said driving means for continuously rotating said antenna, said predetermined position being along the actual course of said airplane, and means coupled between the rotor of said second self-synchronous means and said indicator for generating in response to the signal induced in said rotor marker pulses indicative of the instance that the antenna is directed along said actual course and for applying said marker pulses to said indicator for producing a continuous indication of said actual course as said antenna rotates.

References Cited in the file of this patent

UNITED STATES PATENTS

| 1,820,647 | Brown | Aug. 25, 1931 |
| 2,208,376 | Luck | July 16, 1940 |
| 2,223,224 | Newhouse | Nov. 26, 1940 |
| 2,403,562 | Smith | July 9, 1946 |
| 2,410,831 | Maybarduk | Nov. 12, 1947 |
| 2,414,108 | Knowles | Jan. 14, 1947 |
| 2,447,728 | Bartholy | Aug. 24, 1948 |
| 2,476,032 | Feldman et al. | July 12, 1949 |

FOREIGN PATENTS

| 551,376 | Great Britain | Feb. 19, 1943 |